United States Patent
Kim et al.

(10) Patent No.: US 10,496,899 B1
(45) Date of Patent: Dec. 3, 2019

(54) LEARNING METHOD AND LEARNING DEVICE FOR ADJUSTING PARAMETERS OF CNN IN WHICH RESIDUAL NETWORKS ARE PROVIDED FOR META LEARNING, AND TESTING METHOD AND TESTING DEVICE USING THE SAME

(71) Applicant: Stradvision, Inc., Pohang, Gyeongbuk (KR)

(72) Inventors: Kye-Hyeon Kim, Seoul (KR); Yongjoong Kim, Gyeongsangbuk-do (KR); Insu Kim, Gyeongsangbuk-do (KR); Hak-Kyoung Kim, Gyeongsangbuk-do (KR); Woonhyun Nam, Pohang-si (KR); SukHoon Boo, Gyeonggi-do (KR); Myungchul Sung, Gyeongsangbuk-do (KR); Donghun Yeo, Gyeongsangbuk-do (KR); Wooju Ryu, Gyeongsangbuk-do (KR); Taewoong Jang, Seoul (KR); Kyungjoong Jeong, Pohang-si (KR); Hongmo Je, Pohang-si (KR); Hojin Cho, Gyeongsangbuk-do (KR)

(73) Assignee: Stradvision, Inc., Pohang, Gyeongbuk (KR)

( * ) Notice: Subject to any disclaimer, the term of this patent is extended or adjusted under 35 U.S.C. 154(b) by 0 days.

(21) Appl. No.: 16/258,047

(22) Filed: Jan. 25, 2019

(51) Int. Cl.
*G06K 9/00* (2006.01)
*G06K 9/62* (2006.01)
*G06N 3/08* (2006.01)

(52) U.S. Cl.
CPC ......... *G06K 9/6262* (2013.01); *G06K 9/6232* (2013.01); *G06K 9/6256* (2013.01); *G06N 3/084* (2013.01)

(58) Field of Classification Search
CPC .. G06K 9/6262; G06K 9/6232; G06K 9/6256; G06N 3/084
See application file for complete search history.

(56) References Cited

U.S. PATENT DOCUMENTS 10,007,865 B1 * 6/2018 Kim ............... G06K 9/6231
10,169,679 B1 * 1/2019 Kim ............... G06K 9/6256
(Continued)

OTHER PUBLICATIONS

Wu et al., BlockDrop: Dynamic Inference Paths in Residual Networks, Nov. 22 2017, pp. 1-11.*

(Continued)

*Primary Examiner* — John B Strege
(74) *Attorney, Agent, or Firm* — Kaplan Breyer Schwarz, LLP

(57) ABSTRACT

A CNN-based method for meta learning, i.e., learning to learning, by using a learning device including convolutional layers capable of applying convolution operations to an image or its corresponding input feature maps to generate output feature maps, and residual networks capable of feed-forwarding the image or its corresponding input feature maps to next convolutional layer through bypassing the convolutional layers or its sub-convolutional layers is provided. The CNN-based method includes steps of: the learning device (a) selecting a specific residual network to be dropped out among the residual networks; (b) feeding the image into a transformed CNN where the specific residual network is dropped out, and outputting a CNN output; and (c) calculating losses by using the CNN output and its corresponding GT, and adjusting parameters of the transformed CNN. Further, the CNN-based method can be also applied to layer-wise dropout, stochastic ensemble, virtual driving, and the like.

26 Claims, 7 Drawing Sheets

(56) References Cited

U.S. PATENT DOCUMENTS

| | | | | |
|---|---|---|---|---|
| 10,198,671 B1* | 2/2019 | Yang | | G06K 9/6269 |
| 10,223,614 B1* | 3/2019 | Kim | | G06K 9/6262 |
| 10,229,346 B1* | 3/2019 | Kim | | G06K 9/6262 |
| 2016/0148079 A1* | 5/2016 | Shen | | G06K 9/4628 |
| | | | | 382/157 |
| 2016/0148080 A1* | 5/2016 | Yoo | | G06K 9/4628 |
| | | | | 382/157 |
| 2017/0011281 A1* | 1/2017 | Dijkman | | G06K 9/66 |
| 2017/0124409 A1* | 5/2017 | Choi | | G06N 3/0454 |
| 2017/0124415 A1* | 5/2017 | Choi | | G06N 3/08 |
| 2017/0169315 A1* | 6/2017 | Vaca Castano | | G06K 9/3233 |
| 2017/0186176 A1* | 6/2017 | Paluri | | G06K 9/6212 |
| 2017/0206431 A1* | 7/2017 | Sun | | G06N 3/084 |
| 2018/0096457 A1* | 4/2018 | Sawides | | G06K 9/6267 |
| 2018/0137642 A1* | 5/2018 | Malisiewicz | | G06T 7/11 |
| 2018/0211403 A1* | 7/2018 | Hotson | | G06K 9/4604 |
| 2018/0267997 A1* | 9/2018 | Lin | | G06T 7/33 |
| 2018/0268234 A1* | 9/2018 | Yang | | G06N 3/063 |
| 2018/0336469 A1* | 11/2018 | O'Connor | | G06N 3/04 |
| 2018/0342061 A1* | 11/2018 | Xiang | | G06K 9/00463 |
| 2019/0012548 A1* | 1/2019 | Levi | | G06K 9/00791 |
| 2019/0026917 A1* | 1/2019 | Liao | | G06T 7/73 |
| 2019/0050681 A1* | 2/2019 | Tate | | G06K 9/6232 |
| 2019/0073553 A1* | 3/2019 | Yao | | G06K 9/46 |

OTHER PUBLICATIONS

Srivastava et al., Dropout: A simple way to prevent Neural Networks from Overfitting, Jun. 2014, Journal of Machine Learning Research 15.*

Badrinarayanan et al., SegNet: A Deep Convolutional Encoder-Decoder Architecture for Image Segmentation, Dec. 2017, IEEE Transactions on Pattern Analysis and Machine Intelligence, vol. 39, No. 12.*

* cited by examiner

STANDARD NEURAL NET

AFTER APPLYING DROPOUT

LEARNING METHOD AND LEARNING DEVICE FOR ADJUSTING PARAMETERS OF CNN IN WHICH RESIDUAL NETWORKS ARE PROVIDED FOR META LEARNING, AND TESTING METHOD AND TESTING DEVICE USING THE SAME

FIELD OF THE DISCLOSURE

The present disclosure relates to a learning method, a learning device, a testing method and a testing device for use with an autonomous vehicle, virtual driving, and the like; and more particularly, to the learning method and the learning device for adjusting parameters of CNN, and the testing method and the testing device using the same.

BACKGROUND OF THE DISCLOSURE

Deep learning is a technology used to cluster or classify objects or data. For example, computers cannot distinguish dogs and cats from photographs alone. But a human can easily distinguish those two. To this end, a method called "machine learning" was devised. It is a technique to allow a computer to classify similar things among lots of data inputted thereto. When a photo of an animal similar to a dog is inputted, the computer may classify it as a dog photo.

There have already been many machine learning algorithms to classify various data. For example, a decision tree, a Bayesian network, a support vector machine (SVM), an artificial neural network, etc. have been developed. The deep learning is a descendant of the artificial neural network.

Deep Convolution Neural Networks (Deep CNNs) are the heart of the remarkable development in deep learning. CNNs have already been used in the 90's to solve the problem of character recognition, but their use has become as widespread as it is now thanks to recent researches. These deep CNNs won the 2012 ImageNet image classification tournament, crushing other competitors. Then, the convolution neural network has become a very useful tool in the field of the machine learning.

Image segmentation is a way to receive an image as an input and produce a labeled image as an output. As deep learning technology has recently become popular, the image segmentation also adopts the deep learning. According to a conventional technology, the image segmentation was performed by (i) applying one or more convolution operations to an input image to thereby generate a feature vector and (ii) applying one or more fully connected operations to the feature vector to thereby generate a label image. According to another conventional technology, an encoder-decoder configuration was designed to extract features on an input image by using an encoder and reconstruct a label image by using a decoder.

FIG. 1 is a drawing schematically illustrating a process of performing the segmentation by using a general convolutional neural network (CNN).

Referring to FIG. 1, according to a conventional lane detection method, a learning device receives an input image and applies a plurality of convolution operations and non-linear operations such as ReLU at a plurality of convolutional layers to the input image, to thereby obtain a plurality of feature maps, and applies a plurality of deconvolution operations and SoftMax operations at a plurality of deconvolutional layers to the feature maps, to thereby obtain segmentation results.

FIGS. 2A and 2B are drawings illustrating dropout in a neural network.

The dropout is frequently used in a fully connected (FC) layer, and since all nodes of the FC layer are connected, overfitting may frequently occur, which is a problem. For example, while performing a learning process of recognizing a dog, if training images include images of white dogs, only a white dog may be recognized as a dog. This is a problem generated due to a small number of the training images or a large capacity of a network.

FIGS. 2A and 2B illustrate a configuration of a neural network without the dropout and that with the dropout. Herein, the dropout is one of methods that are introduced to solve such a problem. FIG. 2A is a drawing illustrating a configuration of a neural network having two FC layers. Referring to FIG. 2A, each of values of nodes in one FC layer is calculated by applying its corresponding weight to (i) each of element values of each of inputs or (ii) each of element values of each of nodes in its corresponding previous FC layer.

FIG. 2B illustrates a configuration of a neural network in which some nodes are dropped out. Herein, the neural network performs a learning process while one or more arbitrary nodes in one or more FC layers are dropped out. The nodes denoted as "X" in FIG. 2B are dropped out.

Likewise, not the entire weight may be set to be contributed to the learning process, but only some nodes may be set to be contributed to the learning process. The selected nodes are randomly changed for each learning process.

However, a method for improving a performance of the learning process by using one or more residual networks, without dropping out inner nodes of each layer of the neural network, is required.

SUMMARY OF THE DISCLOSURE

It is an object of the present disclosure to solve all the aforementioned problems.

It is another object of the present disclosure to provide a method for dropping out a layer itself without dropping out some nodes in a layer.

It is still another object of the present disclosure to provide a method for resolving an over-fitting problem without increasing an amount of learning data or reducing the number of features.

In accordance with one aspect of the present disclosure, there is provided a convolutional neural network (CNN)-based learning method by using a learning device including (i) one or more convolutional layers capable of applying one or more convolution operations to an input image or its corresponding one or more encoded input feature maps to thereby sequentially generate one or more encoded output feature maps and (ii) one or more residual networks capable of feed-forwarding the input image or its corresponding encoded input feature maps to its corresponding next convolutional layer through bypassing at least one of the convolutional layers or at least one of sub-convolutional layers included in at least one of the convolutional layers, including steps of: (a) the learning device, if the input image is acquired, performing a process of randomly selecting a specific residual network to be dropped out among the residual networks; (b) the learning device (i) feeding the input image into at least one transformed CNN in which the specific residual network is dropped out, to thereby generate adjusted encoded output feature maps and (ii) generating a CNN output by using the adjusted encoded output feature maps; and (c) the learning device calculating one or more losses by using the CNN output and its corresponding GT and adjusting at least one parameter of the transformed CNN by backpropagating the losses.

As one example, assuming that the number of the convolutional layers is N and each of the N convolutional layers has L sub-convolutional layers, each of the N convolutional layers includes M sub-residual networks having each different bypassing route for bypassing at least one of the L sub-convolutional layers, wherein, at the step of (a), at least one specific sub-residual network to be dropped out is randomly selected among the N×M sub-residual networks.

As one example, the steps of (a) to (c) are repeated for the same input image.

As one example, the learning device further includes: (i) one or more deconvolutional layers capable of applying one or more deconvolutional operations to at least part of the adjusted encoded output feature maps or its corresponding adjusted decoded input feature maps to thereby sequentially generate one or more adjusted decoded output feature maps and (ii) one or more intermediate layers, which are located between at least one of the convolutional layers and at least one of the deconvolutional layers, capable of applying one or more convolution operations to one or more inputs fed thereto and then feeding one or more outputs therefrom into at least one of the deconvolutional layers, wherein, at the step of (a), the learning device performs a process of randomly selecting the specific residual network and at least one specific intermediate layer to be dropped out among the residual networks and the intermediate layers, and wherein, at the step of (b), the learning device controls the transformed CNN such that the specific residual network and the specific intermediate layer are dropped out.

As one example, the learning device further includes additional residual networks capable of feed-forwarding the adjusted decoded input feature maps to its corresponding next deconvolutional layer through bypassing at least one of the plurality of deconvolutional layers, wherein, assuming that (i) each of the N convolutional layers includes L sub-convolutional layers and (ii) each of the N deconvolutional layers includes L sub-deconvolutional layers, and the number of the intermediate layers is K, (1) each of the N convolutional layers includes M sub-residual networks having each different bypassing route through which at least one of the L sub-convolutional layers is bypassed and (2) each of the N deconvolutional layers includes M sub-residual networks having each different bypassing route through which at least one of the L sub-deconvolutional layers is bypassed, and wherein, at the step of (a), at least one specific intermediate layer and at least one specific sub-residual network to be dropped out are randomly selected among the K intermediate layers and the 2×N×M sub-residual networks, respectively.

As one example, at least one of the intermediate layers is a dilated convolutional layer.

As one example, at the step of (c), the learning device backpropagates the losses to thereby adjust at least one parameter of the deconvolutional layers, the intermediate layers, and the convolutional layers.

In accordance with another aspect of the present disclosure, there is provided a method for testing a test image based on a convolutional neural network (CNN), including steps of: (a) on condition that, assuming that a learning device includes (i) one or more convolutional layers capable of applying one or more convolution operations to a training image or its corresponding one or more encoded input feature maps for training to thereby sequentially generate one or more encoded output feature maps for training and (ii) one or more residual networks capable of feed-forwarding the training image or its corresponding encoded input feature maps for training to its corresponding next convolutional layer through bypassing at least one of the convolutional layers or at least one of sub-convolutional layers included in at least one of the convolutional layers, (1) the learning device has performed a process of randomly selecting a specific residual network to be dropped out among the residual networks, (2) the learning device (i) has fed the training image into at least one transformed CNN in which the specific residual network is dropped out, to thereby generate adjusted encoded output feature maps for training and (ii) has generated a CNN output for training by using the adjusted encoded output feature maps for training, and (3) the learning device has calculated one or more losses by using the CNN output for training and its corresponding GT and has adjusted at least one parameter of the transformed CNN by backpropagating the losses, a testing device acquiring the test image; and (b) the testing device generating one or more encoded output feature maps for testing based on the test image and generating a CNN output for testing by using the encoded output feature maps for testing.

As one example, assuming that the number of the convolutional layers is N and each of the N convolutional layers has L sub-convolutional layers, each of the N convolutional layers includes M sub-residual networks having each different bypassing route for bypassing at least one of the L sub-convolutional layers, wherein, at the process of (1), at least one specific sub-residual network to be dropped out is randomly selected among the N×M sub-residual networks.

As one example, the processes of (1) to (3) are repeated for the same training image.

As one example, on condition that the test device includes (i) the convolutional layers capable of applying the convolution operations to the test image or its corresponding one or more encoded input feature maps for testing to thereby sequentially generate the encoded output feature maps for testing and (ii) the residual networks capable of feed-forwarding the test image or its corresponding encoded input feature maps for testing to its corresponding next convolutional layer through bypassing at least one of the convolutional layers or at least one of the sub-convolutional layers included in at least one of the convolutional layers, at the step of (b), the testing device (b-i) performs a process of randomly selecting a certain residual network to be dropped out among the residual networks, and (b-ii) feeds the test image into the transformed CNN in which the certain residual network is dropped out, to thereby generate adjusted encoded output feature maps for testing, and then generates the CNN output for testing by using the adjusted encoded output feature maps for testing.

As one example, the testing device further includes: (i) one or more deconvolutional layers capable of applying one or more deconvolutional operations to at least part of the adjusted encoded output feature maps for testing or its corresponding adjusted decoded input feature maps for testing to thereby sequentially generate one or more adjusted decoded output feature maps for testing and (ii) one or more intermediate layers, which are located between at least one of the convolutional layers and at least one of the deconvolutional layers, capable of applying one or more convolution operations to one or more inputs fed thereto and then feeding one or more outputs therefrom into at least one of the deconvolutional layers, wherein, at the step of (b-i), the testing device performs a process of randomly selecting the certain residual network and at least one certain intermediate layer to be dropped out among the residual networks and the intermediate layers, and wherein, at the step of (b-ii), the testing device controls the transformed CNN such that the certain residual network and the certain intermediate layer are dropped out.

As one example, the testing device further includes additional residual networks capable of feed-forwarding the adjusted decoded input feature maps for testing to its corresponding next deconvolutional layer through bypassing at least one of the plurality of deconvolutional layers, wherein, assuming that (i) each of the N convolutional layers includes L sub-convolutional layers and (ii) each of the N deconvolutional layers includes L sub-deconvolutional layers, and the number of the intermediate layers is K, (1) each of the N convolutional layers includes M sub-residual networks having each different bypassing route through which at least one of the L sub-convolutional layers is bypassed and (2) each of the N deconvolutional layers includes M sub-residual networks having each different bypassing route through which at least one of the L sub-deconvolutional layers is bypassed, and wherein, at the step of (b-i), at least one certain intermediate layer and at least one certain sub-residual network to be dropped out are randomly selected among the K intermediate layers and the 2×N×M sub-residual networks, respectively.

As one example, at least one of the intermediate layers is a dilated convolutional layer.

As one example, at the process of (3), the learning device has backpropagated the losses to thereby adjust at least one parameter of the deconvolutional layers, the intermediate layers, and the convolutional layers.

In accordance with still another aspect of the present disclosure, there is provided a learning device in which (i) one or more convolutional layers capable of applying one or more convolution operations to an input image or its corresponding one or more encoded input feature maps to thereby sequentially generate one or more encoded output feature maps and (ii) one or more residual networks capable of feed-forwarding the input image or its corresponding encoded input feature maps to its corresponding next convolutional layer through bypassing at least one of the convolutional layers or at least one of sub-convolutional layers included in at least one of the convolutional layers are included, including: at least one memory that stores instructions; and at least one processor configured to execute the instructions to: perform processes of (I) randomly selecting a specific residual network to be dropped out among the residual networks, (II) (i) feeding the input image into at least one transformed CNN in which the specific residual network is dropped out, to thereby generate adjusted encoded output feature maps and (ii) generating a CNN output by using the adjusted encoded output feature maps, and (III) calculating one or more losses by using the CNN output and its corresponding GT and adjusting at least one parameter of the transformed CNN by backpropagating the losses.

As one example, assuming that the number of the convolutional layers is N and each of the N convolutional layers has L sub-convolutional layers, each of the N convolutional layers includes M sub-residual networks having each different bypassing route for bypassing at least one of the L sub-convolutional layers, wherein, at the process of (I), at least one specific sub-residual network to be dropped out is randomly selected among the N×M sub-residual networks.

As one example, the processes of (I) to (III) are repeated for the same input image.

As one example, the learning device further includes: (i) one or more deconvolutional layers capable of applying one or more deconvolutional operations to at least part of the adjusted encoded output feature maps or its corresponding adjusted decoded input feature maps to thereby sequentially generate one or more adjusted decoded output feature maps and (ii) one or more intermediate layers, which are located between at least one of the convolutional layers and at least one of the deconvolutional layers, capable of applying one or more convolution operations to one or more inputs fed thereto and then feeding one or more outputs therefrom into at least one of the deconvolutional layers, wherein, at the process of (I), the processor performs a process of randomly selecting the specific residual network and at least one specific intermediate layer to be dropped out among the residual networks and the intermediate layers, and wherein, at the process of (II), the processor controls the transformed CNN such that the specific residual network and the specific intermediate layer are dropped out.

As one example, the learning device further includes additional residual networks capable of feed-forwarding the adjusted decoded input feature maps to its corresponding next deconvolutional layer through bypassing at least one of the plurality of deconvolutional layers, wherein, assuming that (i) each of the N convolutional layers includes L sub-convolutional layers and (ii) each of the N deconvolutional layers includes L sub-deconvolutional layers, and the number of the intermediate layers is K, (1) each of the N convolutional layers includes M sub-residual networks having each different bypassing route through which at least one of the L sub-convolutional layers is bypassed and (2) each of the N deconvolutional layers includes M sub-residual networks having each different bypassing route through which at least one of the L sub-deconvolutional layers is bypassed, and wherein, at the process of (I), at least one specific intermediate layer and at least one specific sub-residual network to be dropped out are randomly selected among the K intermediate layers and the 2×N×M sub-residual networks, respectively.

As one example, at least one of the intermediate layers is a dilated convolutional layer.

As one example, at the process of (III), the processor backpropagates the losses to thereby adjust at least one parameter of the deconvolutional layers, the intermediate layers, and the convolutional layers.

In accordance with still yet another aspect of the present disclosure, there is provided a testing device for testing a test image based on a convolutional neural network (CNN), including: at least one memory that stores instructions; and at least one processor, on condition that, assuming that a learning device includes (i) one or more convolutional layers capable of applying one or more convolution operations to a training image or its corresponding one or more encoded input feature maps for training to thereby sequentially generate one or more encoded output feature maps for training and (ii) one or more residual networks capable of feed-forwarding the training image or its corresponding encoded input feature maps for training to its corresponding next convolutional layer through bypassing at least one of the convolutional layers or at least one of sub-convolutional layers included in at least one of the convolutional layers, (1) the learning device has performed a process of randomly selecting a specific residual network to be dropped out among the residual networks, (2) the learning device (i) has fed the training image into at least one transformed CNN in which the specific residual network is dropped out, to thereby generate adjusted encoded output feature maps for training and (ii) has generated a CNN output for training by using the adjusted encoded output feature maps for training, and (3) the learning device has calculated one or more losses by using the CNN output for training and its corresponding GT and has adjusted at least one parameter of the transformed CNN by backpropagating the losses; configured to execute the instructions to: perform a process of generating one or more encoded output feature maps for testing based on the test image and generating a CNN output for testing by using the encoded output feature maps for testing.

As one example, assuming that the number of the convolutional layers is N and each of the N convolutional layers has L sub-convolutional layers, each of the N convolutional layers includes M sub-residual networks having each different bypassing route for bypassing at least one of the L sub-convolutional layers, wherein, at the process of (1), at least one specific sub-residual network to be dropped out is randomly selected among the N×M sub-residual networks.

As one example, the processes of (1) to (3) are repeated for the same training image.

As one example, on condition that the test device includes (i) the convolutional layers capable of applying the convolution operations to the test image or its corresponding one or more encoded input feature maps for testing to thereby sequentially generate the encoded output feature maps for testing and (ii) the residual networks capable of feed-forwarding the test image or its corresponding encoded input feature maps for testing to its corresponding next convolutional layer through bypassing at least one of the convolutional layers or at least one of the sub-convolutional layers included in at least one of the convolutional layers, the processor performs processes of (I) randomly selecting a certain residual network to be dropped out among the residual networks, and (II) feeding the test image into the transformed CNN in which the certain residual network is dropped out, to thereby generate adjusted encoded output feature maps for testing, and then generating the CNN output for testing by using the adjusted encoded output feature maps for testing.

As one example, the testing device further includes: (i) one or more deconvolutional layers capable of applying one or more deconvolutional operations to at least part of the adjusted encoded output feature maps for testing or its corresponding adjusted decoded input feature maps for testing to thereby sequentially generate one or more adjusted decoded output feature maps for testing and (ii) one or more intermediate layers, which are located between at least one of the convolutional layers and at least one of the deconvolutional layers, capable of applying one or more convolution operations to one or more inputs fed thereto and then feeding one or more outputs therefrom into at least one of the deconvolutional layers, wherein, at the process of (I), the processor randomly selects the certain residual network and at least one certain intermediate layer to be dropped out among the residual networks and the intermediate layers, and wherein, at the process of (II), the processor controls the transformed CNN such that the certain residual network and the certain intermediate layer are dropped out.

As one example, the testing device further includes additional residual networks capable of feed-forwarding the adjusted decoded input feature maps for testing to its corresponding next deconvolutional layer through bypassing at least one of the plurality of deconvolutional layers, wherein, assuming that (i) each of the N convolutional layers includes L sub-convolutional layers and (ii) each of the N deconvolutional layers includes L sub-deconvolutional layers, and the number of the intermediate layers is K, (1) each of the N convolutional layers includes M sub-residual networks having each different bypassing route through which at least one of the L sub-convolutional layers is bypassed and (2) each of the N deconvolutional layers includes M sub-residual networks having each different bypassing route through which at least one of the L sub-deconvolutional layers is bypassed, and wherein, at the process of (I), at least one certain intermediate layer and at least one certain sub-residual network to be dropped out are randomly selected among the K intermediate layers and the 2×N×M sub-residual networks, respectively.

As one example, at least one of the intermediate layers is a dilated convolutional layer.

As one example, at the process of (3), the learning device has backpropagated the losses to thereby adjust at least one parameter of the deconvolutional layers, the intermediate layers, and the convolutional layers.

BRIEF DESCRIPTION OF THE DRAWINGS

The above and other objects and features of the present disclosure will become apparent from the following description of preferred embodiments given in conjunction with the accompanying drawings, in which.

DETAILED DESCRIPTION OF THE PREFERRED EMBODIMENTS

Figure 1:
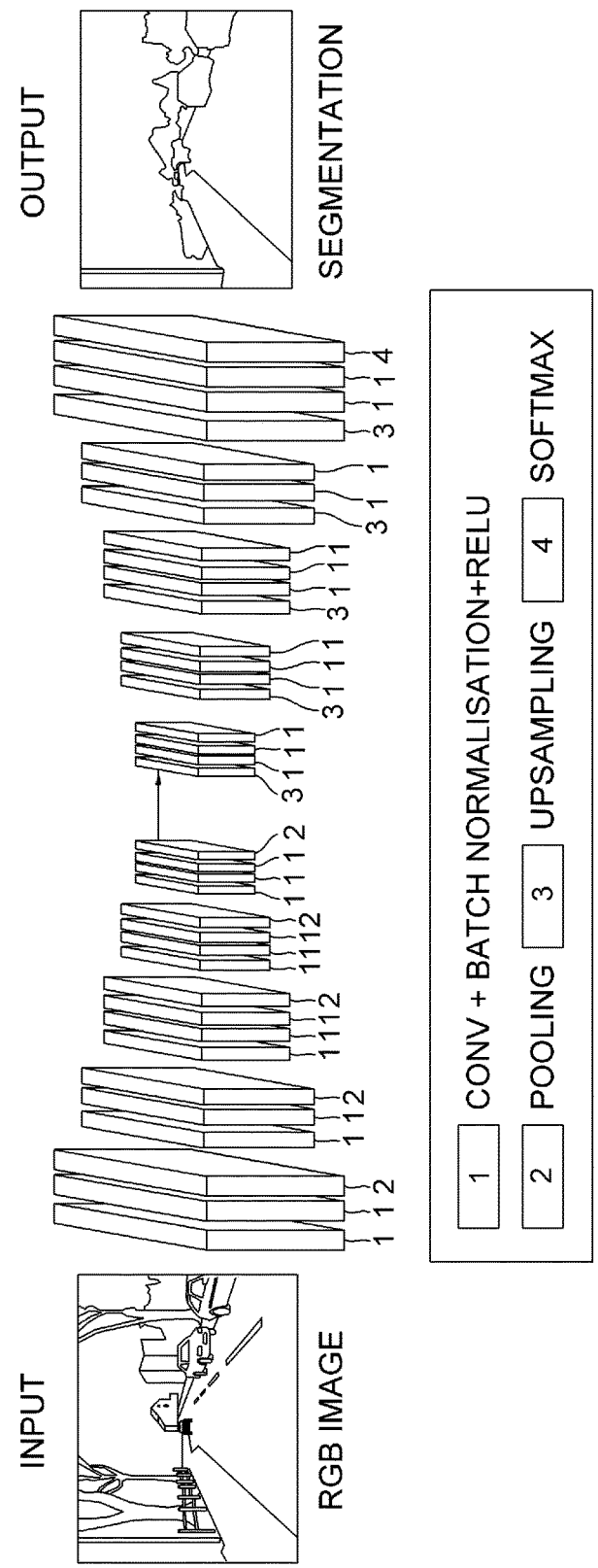
FIG. 1 is a drawing schematically illustrating a segmentation process by using a conventional convolutional neural network (CNN).
Figure 2A:
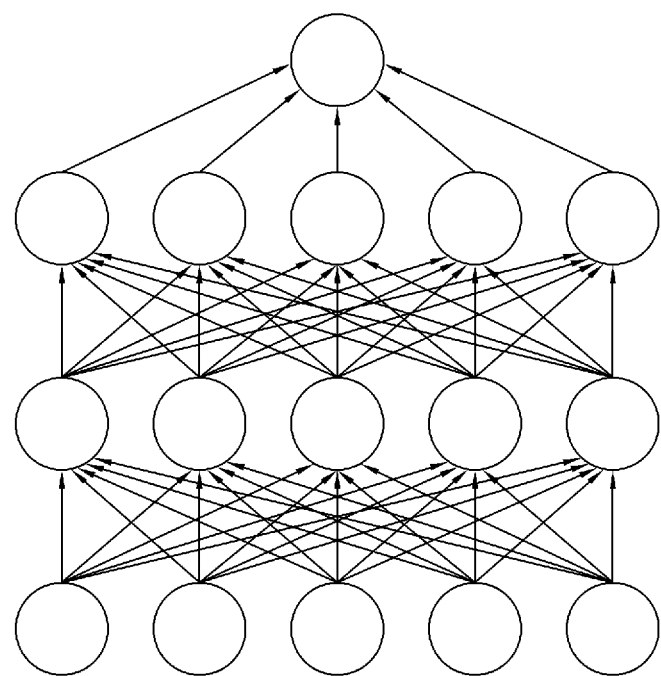
FIGS. 2A and 2B are drawings illustrating a configuration of a neural network without the dropout and that with the dropout.
Figure 2B:
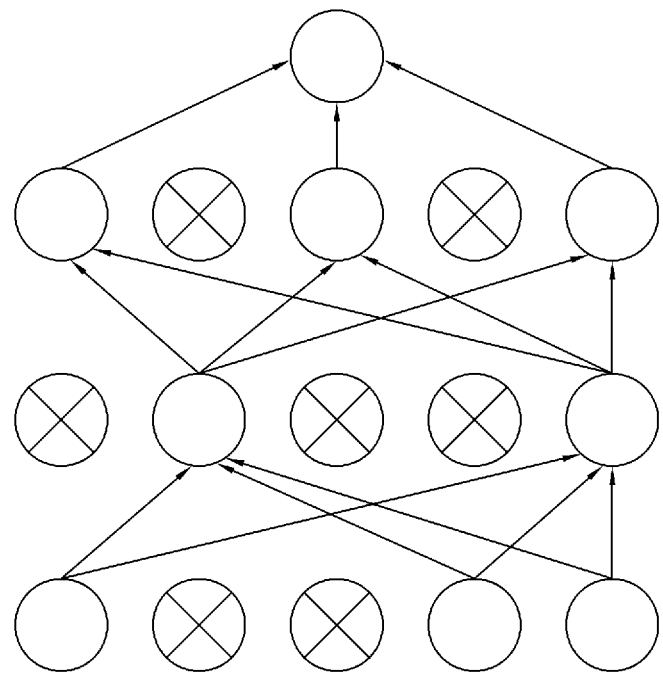

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the disclosure.

Besides, in the detailed description and claims of the present disclosure, a term "include" and its variations are not intended to exclude other technical features, additions, components or steps. Other objects, benefits, and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

To allow those skilled in the art to the present disclosure to be carried out easily, the example embodiments of the present disclosure by referring to attached diagrams will be explained in detail as shown below.

Figure 3:
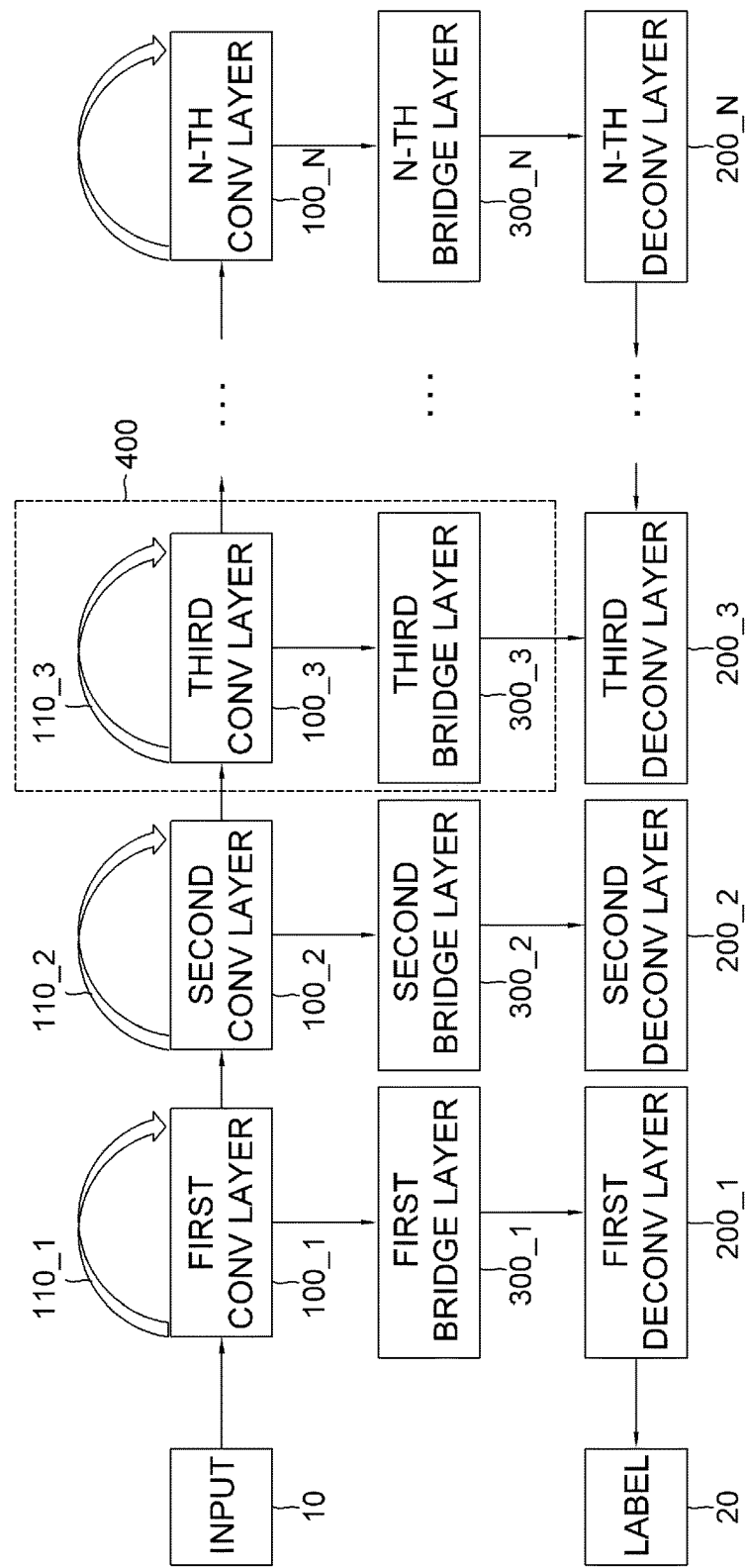
FIG. 3 is a drawing illustrating a configuration of a CNN including residual networks and bridge layers in accordance with the present disclosure.

FIG. 3 is a drawing illustrating a configuration of a CNN including residual networks and bridge layers in accordance with the present disclosure.

Referring to FIG. 3, a learning device based on a convolutional neural network, i.e., CNN, in accordance with the present disclosure includes a first convolutional layer 100_1, a second convolutional layer 100_2, . . . , an N-th convolutional layer 100_N, and an N-th deconvolutional layer 200_N, . . . , a second deconvolutional layer 200_2, a first deconvolutional layer 200_1. Further, an intermediate layer, i.e., the bridge layer, exits between each convolutional layer and its corresponding deconvolutional layer. Herein, in the configuration of the CNN in accordance with the present disclosure, the bridge layers are not essential elements. A first bridge layer 300_1 is arranged between the first convolutional layer 100_1 and the first deconvolutional layer 200_1. A second bridge layer 300_2 is arranged between the second convolutional layer 100_2 and the second deconvolutional layer 200_2. An N-th bridge layer 300_N is arranged between the N-th convolutional layer 100_N and the N-th deconvolutional layer 200_N, and the like. Further, each of the convolutional layers may include each of residual networks 110_1 to 110_N capable of feed-forwarding an input image or its corresponding encoded input feature maps to its corresponding next convolutional layer through bypassing at least one of the convolutional layers or at least one of sub-convolutional layers included in at least one of the convolutional layers.

FIG. 3 illustrates that each of the residual networks 110_1 to 110_N is arranged between its corresponding convolutional layer and its corresponding deconvolutional layer, but this is just briefly illustrated. A configuration of one of the residual networks will be described in detail by referring to FIG. 4. Further, though not illustrated in FIG. 3, at least one of the residual networks bypassing at least one of sub-deconvolutional layers may also exist in each of the deconvolutional layers. Herein, the bridge layer may be a dilated convolutional layer.

Figure 4:
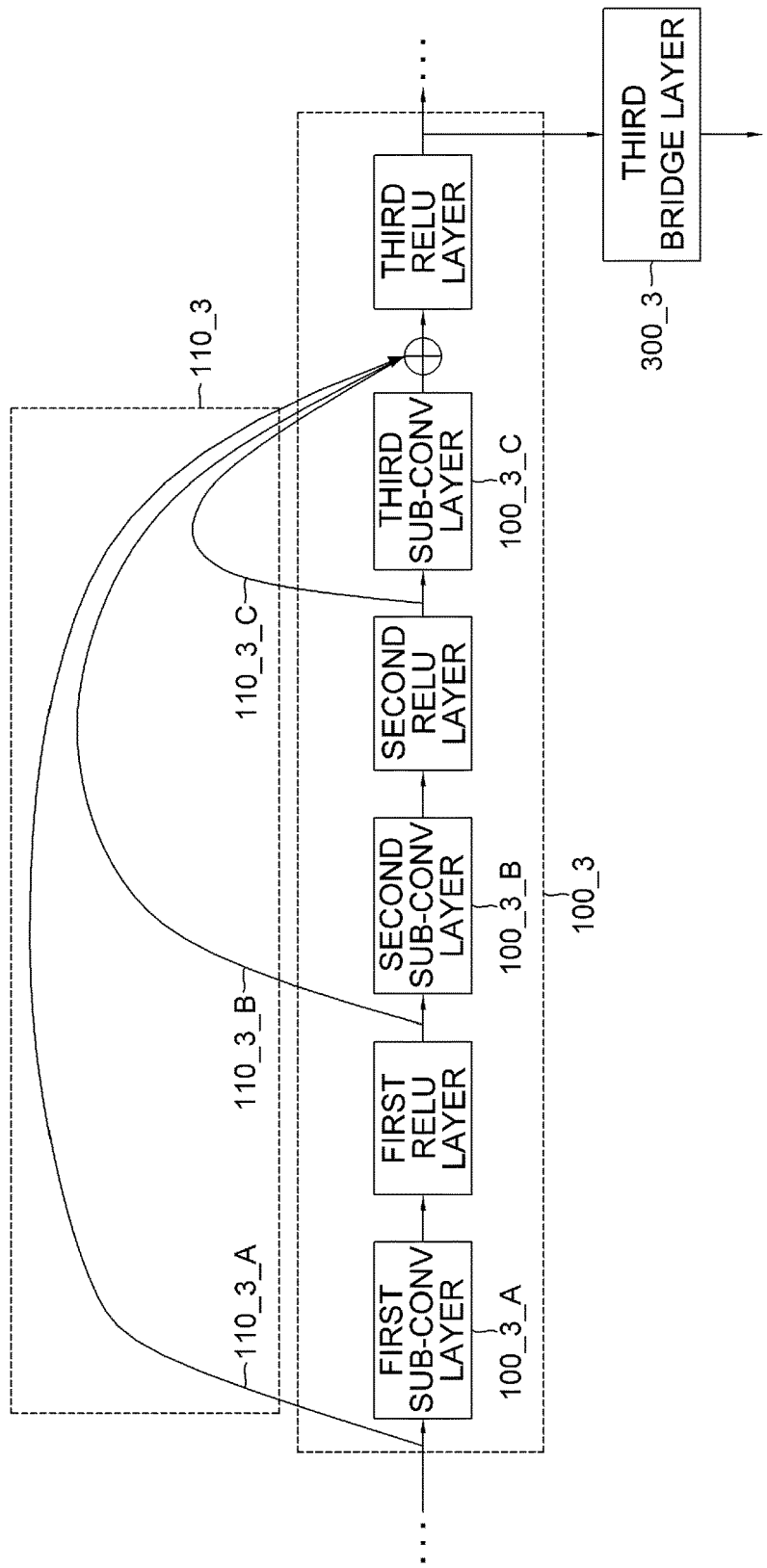
FIG. 4 is a drawing illustrating a configuration of a plurality of residual networks in a convolutional layer of a reference number 400 in FIG. 3.

FIG. 4 is a drawing illustrating a configuration of the residual networks in a convolutional layer, i.e., a layer with a reference number 400 in FIG. 3.

FIG. 4 illustrates a configuration of the third convolutional layer 100_3 in which three sub-convolutional layers 100_3_a, 100_3_b, and 100_3_c, and three ReLU layers are arranged. Namely, in the third convolutional layer 100_3, the first sub-convolutional layer 100_3_a, a first ReLU layer, the second sub-convolutional layer 100_3_b, a second ReLU layer, the third sub-convolutional layer 100_3_c, and a third ReLU layer are sequentially arranged.

Further, the third convolutional layer 100_3 includes (i) a first residual network 110_3_a for feed-forwarding a second encoded output feature map, outputted from the second convolutional layer 100_2, through bypassing the first sub-convolutional layer 100_3_a, the first ReLU, the second sub-convolutional layer 100_3_b, the second ReLU and the third sub-convolutional layer 100_3_c, (ii) a second residual network 110_3_b for feed-forwarding a first non-linear output feature map, outputted from the first ReLU, through bypassing the second sub-convolutional layer 100_3_b, the second ReLU and the third sub-convolutional layer 100_3_c, and (iii) a third residual network 110_3_c for feed-forwarding a second non-linear output feature map, outputted from the second ReLU, through bypassing the third sub-convolutional layer 100_3_c.

At an input end of the third ReLU, (i) a feature map outputted from the second convolutional layer 100_2, i.e., the second encoded output feature map, (ii) a feature map outputted from the first ReLU, i.e., the first non-linear output feature map, (iii) a feature map outputted from the second ReLU, i.e., the second non-linear output feature map, and (iv) a feature map outputted from the third sub-convolutional layer 100_3_c are concatenated. Further, the concatenated feature map is fed into the third ReLU, to thereby generate a third non-linear output feature map. Herein, the third non-linear output feature map functions as a third encoded output feature map. The third encoded output feature map may be delivered to the third deconvolutional layer via the third bridge layer 300_3.

Further, locations of the ReLU layers and bypassing routes may be variously changed depending on the network design.

Through such a configuration, various feature maps, i.e., a feature map generated by passing through all the sub-convolutional layers, a feature map generated by passing through two sub-convolutional layers, a feature map generated by passing through only one sub-convolutional layer and a feature map generated without passing through any sub-convolutional layer, can be used.

Figure 5:
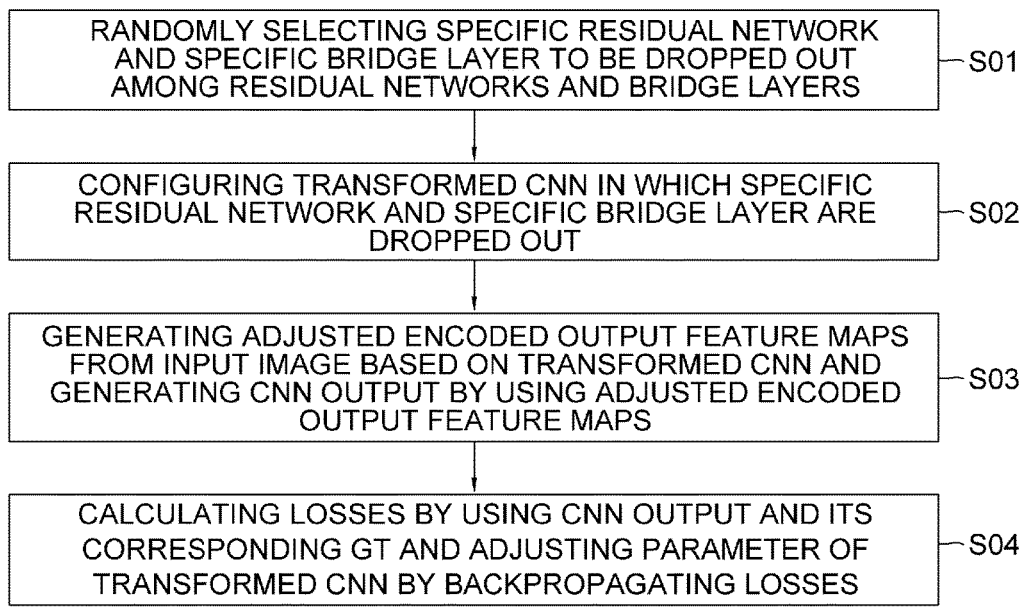
FIG. 5 is a flowchart illustrating a learning process by dropping out one or more layers in accordance with the present disclosure.

FIG. 5 is a flowchart illustrating a learning process by dropping out one or more layers in accordance with the present disclosure.

Referring to FIG. 5, a process of learning the CNN by dropping out one or more layers in accordance with the present disclosure is described as follows. First of all, if an input image, e.g., a training image, is fed into the learning device, the learning device randomly selects a specific residual network and a specific bridge layer to be dropped out among the residual networks and the bridge layers at a step of S01.

Thereafter, the learning device configures a transformed CNN in which the specific residual network and the specific bridge layer are dropped out at a step of S02.

Figure 6:
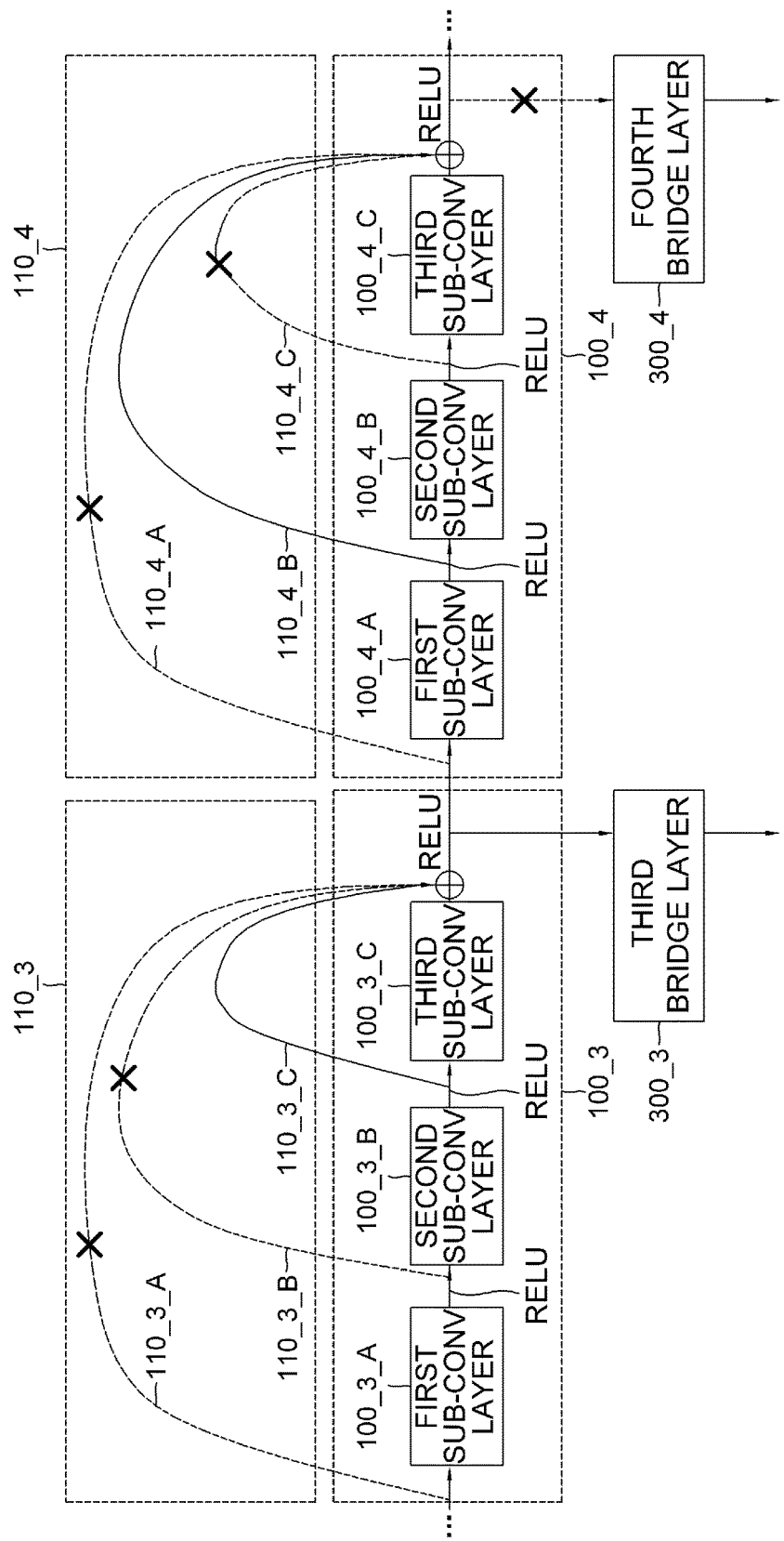
FIG. 6 is a drawing illustrating a transformed CNN in which one or more residual networks and one or more bridge layers are dropped out in accordance with the present disclosure.

FIG. 6 is a drawing illustrating a transformed CNN in which one or more residual networks and one or more bridge layers are dropped out in accordance with the present disclosure.

Referring to FIG. 6, in the third convolutional layer 100_3, a first residual network 110_3_a and a second residual network 110_3_b are selected as the specific residual networks to be dropped out, and in the (1-4)-th convolutional layer 100_4, a first residual network 110_4_a and a third residual network 110_4_c are selected as the specific residual networks to be dropped out. Further, the fourth bridge layer 300_4 is also selected as the specific bridge layer to be dropped out. That is, the transformed CNN is configured such that routes or a layer denoted as "X" is dropped out as shown in FIG. 6.

When considering the entire learning device, for example, each of the N convolutional layers and each of the N deconvolutional layers include L sub-convolutional layers and L sub-deconvolutional layers, respectively. Each of the N convolutional layers and each of the N deconvolutional layers include M sub-residual networks having each different bypassing route through which at least one of the L sub-convolutional layer and at least one of the L sub-deconvolutional layer is bypassed respectively. Further, when the number of the intermediate layers is K, at least one specific intermediate layer and at least one specific sub-residual networks to be dropped out are randomly selected among the K intermediate layers and the 2×N×M sub-residual networks, at a step of S02.

As another example, at the step of S02, only the residual network(s) may be selected as the layer(s) to be dropped out.

For example, assuming that each of the N convolutional layers includes L sub-convolutional layers, and each of the N convolutional layers includes M sub-residual networks having each different bypassing route for bypassing at least one of the L sub-convolutional layer, at the step of S02, the specific sub-residual network to be dropped out may be randomly selected among the N×M sub-residual networks. This may be applied to both the case that the learning device includes the bridge layers and the case that the learning device does not include the bridge layers.

Referring to FIG. 5 again, the learning device generates adjusted encoded output feature maps from the input image, based on the transformed CNN to which the dropout has been applied and generates a CNN output by using the adjusted encoded output feature maps at a step of S03. Herein, the learning device calculates one or more losses by using the CNN output and its corresponding GT and adjusts at least one parameter of the transformed CNN by backpropagating the losses at a step of S04.

Meanwhile, the learning method may be applied to a same input image by repeating the above-mentioned processes or may be applied to various input images by changing the configuration of the transformed CNN.

Further, the learning method illustrated in FIGS. 2 to 6 may be applied to the CNN testing method in the same manner.

For reference, in the description below, the phrase "for training" is added for terms related to the learning processes, and the phrase "for testing" is added for terms related to testing processes, to avoid possible confusion.

Namely, a method for testing a test image based on a convolutional neural network (CNN) includes steps of: (a) on condition that, assuming that a learning device includes (i) one or more convolutional layers capable of applying one or more convolution operations to a training image or its corresponding one or more encoded input feature maps for training to thereby sequentially generate one or more encoded output feature maps for training and (ii) one or more residual networks capable of feed-forwarding the training image or its corresponding encoded input feature maps for training to its corresponding next convolutional layer through bypassing at least one of the convolutional layers or at least one of sub-convolutional layers included in at least one of the convolutional layers, (1) the learning device has performed a process of randomly selecting a specific residual network to be dropped out among the residual networks, (2) the learning device (i) has fed the training image into at least one transformed CNN in which the specific residual network is dropped out, to thereby generate adjusted encoded output feature maps for training and (ii) has generated a CNN output for training by using the adjusted encoded output feature maps for training, and (3) the learning device has calculated one or more losses by using the CNN output for training and its corresponding GT and has adjusted at least one parameter of the transformed CNN by backpropagating the losses, a testing device acquiring the test image; and (b) the testing device generating one or more encoded output feature maps for testing based on the test image and generating a CNN output for testing by using the encoded output feature maps for testing.

The present disclosure has an effect of improving a learning capability by randomly dropping out some layers within the CNN.

The present disclosure has another effect of performing a learning process by using the diversified feature maps.

Further, the CNN-based method for meta learning, i.e., learning to learning, in accordance with the present disclosure can be also applied to layer-wise dropout, stochastic ensemble, virtual driving, and the like.

It would be understood by one of ordinary skill in the art that a transmission and/or a reception of the above-described images such as the training image and the test image can be performed by communication parts of the learning device and the testing device, and processes of the convolution operation, the deconvolution operation, and the loss value operation can be mainly performed by processors of the learning device and the testing device, but the present disclosure is not limited to these examples. In addition, the learning device and the testing device may further include memories capable of storing computer readable instructions for performing the above-described processes. As one example, the processor, the memory, a medium, etc. may be integrated with an integrated processor.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A convolutional neural network (CNN)-based learning method by using a learning device including (i) one or more convolutional layers capable of applying one or more convolution operations to an input image or its corresponding one or more encoded input feature maps to thereby sequentially generate one or more encoded output feature maps and (ii) one or more residual networks capable of feed-forwarding the input image or its corresponding encoded input feature maps to its corresponding next convolutional layer through bypassing at least one of the convolutional layers or at least one of sub-convolutional layers included in at least one of the convolutional layers, comprising steps of:
    (a) the learning device, if the input image is acquired, performing a process of randomly selecting a specific residual network to be dropped out among the residual networks;
    (b) the learning device (i) feeding the input image into at least one transformed CNN in which the specific residual network is dropped out, to thereby generate adjusted encoded output feature maps and (ii) generating a CNN output by using the adjusted encoded output feature maps; and
    (c) the learning device calculating one or more losses by using the CNN output and its corresponding GT and adjusting at least one parameter of the transformed CNN by backpropagating the losses;
    wherein, assuming that the number of the convolutional layers is N and each of the N convolutional layers has L sub-convolutional layers, each of the N convolutional layers includes M sub-residual networks having each different bypassing route for bypassing at least one of the L sub-convolutional layers; and
    wherein, at the step of (a), at least one specific sub-residual network to be dropped out is randomly selected among the N×M sub-residual networks.

2. The CNN-based learning method of claim 1, wherein the steps of (a) to (c) are repeated for the same input image.

3. A convolutional neural network (CNN)-based learning method by using a learning device including (i) one or more convolutional layers capable of applying one or more convolution operations to an input image or its corresponding one or more encoded input feature maps to thereby sequentially generate one or more encoded output feature maps and (ii) one or more residual networks capable of feed-forwarding the input image or its corresponding encoded input feature maps to its corresponding next convolutional layer through bypassing at least one of the convolutional layers or at least one of sub-convolutional layers included in at least one of the convolutional layers, comprising steps of:
    (a) the learning device, if the input image is acquired, performing a process of randomly selecting a specific residual network to be dropped out among the residual networks;
    (b) the learning device (i) feeding the input image into at least one transformed CNN in which the specific residual network is dropped out, to thereby generate adjusted encoded output feature maps and (ii) generating a CNN output by using the adjusted encoded output feature maps; and
    (c) the learning device calculating one or more losses by using the CNN output and its corresponding GT and adjusting at least one parameter of the transformed CNN by backpropagating the losses;
    wherein the learning device further includes: (i) one or more deconvolutional layers capable of applying one or more deconvolutional operations to at least part of the adjusted encoded output feature maps or its corresponding adjusted decoded input feature maps to thereby sequentially generate one or more adjusted decoded output feature maps and (ii) one or more intermediate layers, which are located between at least one of the convolutional layers and at least one of the deconvolutional layers, capable of applying one or more convolution operations to one or more inputs fed thereto and then feeding one or more outputs therefrom into at least one of the deconvolutional layers,
    wherein, at the step of (a), the learning device performs a process of randomly selecting the specific residual network and at least one specific intermediate layer to be dropped out among the residual networks and the intermediate layers, and
    wherein, at the step of (b), the learning device controls the transformed CNN such that the specific residual network and the specific intermediate layer are dropped out.

4. The CNN-based learning method of claim 3, wherein the learning device further includes additional residual networks capable of feed-forwarding the adjusted decoded input feature maps to its corresponding next deconvolutional layer through bypassing at least one of the plurality of deconvolutional layers,
    wherein, assuming that (i) each of the N convolutional layers includes L sub-convolutional layers and (ii) each of the N deconvolutional layers includes L sub-deconvolutional layers, and the number of the intermediate layers is K, (1) each of the N convolutional layers includes M sub-residual networks having each different bypassing route through which at least one of the L sub-convolutional layers is bypassed and (2) each of the N deconvolutional layers includes M sub-residual networks having each different bypassing route through which at least one of the L sub-deconvolutional layers is bypassed, and
    wherein, at the step of (a), at least one specific intermediate layer and at least one specific sub-residual network to be dropped out are randomly selected among the K intermediate layers and the 2×N×M sub-residual networks, respectively.

5. The CNN-based learning method of claim 3, wherein at least one of the intermediate layers is a dilated convolutional layer.

6. The CNN-based learning method of claim 5, wherein, at the step of (c), the learning device backpropagates the losses to thereby adjust at least one parameter of the deconvolutional layers, the intermediate layers, and the convolutional layers.

7. A method for testing a test image based on a convolutional neural network (CNN), comprising steps of:
(a) on condition that, assuming that a learning device includes (i) one or more convolutional layers capable of applying one or more convolution operations to a training image or its corresponding one or more encoded input feature maps for training to thereby sequentially generate one or more encoded output feature maps for training and (ii) one or more residual networks capable of feed-forwarding the training image or its corresponding encoded input feature maps for training to its corresponding next convolutional layer through bypassing at least one of the convolutional layers or at least one of sub-convolutional layers included in at least one of the convolutional layers, (1) the learning device has performed a process of randomly selecting a specific residual network to be dropped out among the residual networks, (2) the learning device (i) has fed the training image into at least one transformed CNN in which the specific residual network is dropped out, to thereby generate adjusted encoded output feature maps for training and (ii) has generated a CNN output for training by using the adjusted encoded output feature maps for training, and (3) the learning device has calculated one or more losses by using the CNN output for training and its corresponding GT and has adjusted at least one parameter of the transformed CNN by backpropagating the losses, a testing device acquiring the test image; and
(b) the testing device generating one or more encoded output feature maps for testing based on the test image and generating a CNN output for testing by using the encoded output feature maps for testing;
wherein, assuming that the number of the convolutional layers is N and each of the N convolutional layers has L sub-convolutional layers, each of the N convolutional layers includes M sub-residual networks having each different bypassing route for bypassing at least one of the L sub-convolutional layers, and
wherein, at the process of (1), at least one specific sub-residual network to be dropped out is randomly selected among the N×M sub-residual networks.

8. The method of claim 7, wherein the processes of (1) to (3) are repeated for the same training image.

9. A method for testing a test image based on a convolutional neural network (CNN), comprising steps of:
(a) on condition that, assuming that a learning device includes (i) one or more convolutional layers capable of applying one or more convolution operations to a training image or its corresponding one or more encoded input feature maps for training to thereby sequentially generate one or more encoded output feature maps for training and (ii) one or more residual networks capable of feed-forwarding the training image or its corresponding encoded input feature maps for training to its corresponding next convolutional layer through bypassing at least one of the convolutional layers or at least one of sub-convolutional layers included in at least one of the convolutional layers, (1) the learning device has performed a process of randomly selecting a specific residual network to be dropped out among the residual networks, (2) the learning device (i) has fed the training image into at least one transformed CNN in which the specific residual network is dropped out, to thereby generate adjusted encoded output feature maps for training and (ii) has generated a CNN output for training by using the adjusted encoded output feature maps for training, and (3) the learning device has calculated one or more losses by using the CNN output for training and its corresponding GT and has adjusted at least one parameter of the transformed CNN by backpropagating the losses, a testing device acquiring the test image; and
(b) the testing device generating one or more encoded output feature maps for testing based on the test image and generating a CNN output for testing by using the encoded output feature maps for testing;
wherein, on condition that the test device includes (i) the convolutional layers capable of applying the convolution operations to the test image or its corresponding one or more encoded input feature maps for testing to thereby sequentially generate the encoded output feature maps for testing and (ii) the residual networks capable of feed-forwarding the test image or its corresponding encoded input feature maps for testing to its corresponding next convolutional layer through bypassing at least one of the convolutional layers or at least one of the sub-convolutional layers included in at least one of the convolutional layers, at the step of (b), the testing device (b-i) performs a process of randomly selecting a certain residual network to be dropped out among the residual networks, and (b-ii) feeds the test image into the transformed CNN in which the certain residual network is dropped out, to thereby generate adjusted encoded output feature maps for testing, and then generates the CNN output for testing by using the adjusted encoded output feature maps for testing.

10. The method of claim 9, wherein the testing device further includes: (i) one or more deconvolutional layers capable of applying one or more deconvolutional operations to at least part of the adjusted encoded output feature maps for testing or its corresponding adjusted decoded input feature maps for testing to thereby sequentially generate one or more adjusted decoded output feature maps for testing and (ii) one or more intermediate layers, which are located between at least one of the convolutional layers and at least one of the deconvolutional layers, capable of applying one or more convolution operations to one or more inputs fed thereto and then feeding one or more outputs therefrom into at least one of the deconvolutional layers,
wherein, at the step of (b-i), the testing device performs a process of randomly selecting the certain residual network and at least one certain intermediate layer to be dropped out among the residual networks and the intermediate layers, and
wherein, at the step of (b-ii), the testing device controls the transformed CNN such that the certain residual network and the certain intermediate layer are dropped out.

11. The method of claim 10, wherein the testing device further includes additional residual networks capable of feed-forwarding the adjusted decoded input feature maps for testing to its corresponding next deconvolutional layer through bypassing at least one of the plurality of deconvolutional layers,
wherein, assuming that (i) each of the N convolutional layers includes L sub-convolutional layers and (ii) each of the N deconvolutional layers includes L sub-deconvolutional layers, and the number of the intermediate layers is K, (1) each of the N convolutional layers includes M sub-residual networks having each different bypassing route through which at least one of the L sub-convolutional layers is bypassed and (2) each of the N deconvolutional layers includes M sub-residual networks having each different bypassing route through which at least one of the L sub-deconvolutional layers is bypassed, and wherein, at the step of (b-i), at least one certain intermediate layer and at least one certain sub-residual network to be dropped out are randomly selected among the K intermediate layers and the 2×N×M sub-residual networks, respectively.

12. The method of claim 10, wherein at least one of the intermediate layers is a dilated convolutional layer.

13. The method of claim 11, wherein, at the process of (3), the learning device has backpropagated the losses to thereby adjust at least one parameter of the deconvolutional layers, the intermediate layers, and the convolutional layers.

14. A learning device in which (i) one or more convolutional layers capable of applying one or more convolution operations to an input image or its corresponding one or more encoded input feature maps to thereby sequentially generate one or more encoded output feature maps and (ii) one or more residual networks capable of feed-forwarding the input image or its corresponding encoded input feature maps to its corresponding next convolutional layer through bypassing at least one of the convolutional layers or at least one of sub-convolutional layers included in at least one of the convolutional layers are included, comprising:

at least one memory that stores instructions; and at least one processor configured to execute the instructions to: perform processes of (I) randomly selecting a specific residual network to be dropped out among the residual networks, (II) (i) feeding the input image into at least one transformed CNN in which the specific residual network is dropped out, to thereby generate adjusted encoded output feature maps and (ii) generating a CNN output by using the adjusted encoded output feature maps, and (III) calculating one or more losses by using the CNN output and its corresponding GT and adjusting at least one parameter of the transformed CNN by backpropagating the losses;

wherein, assuming that the number of the convolutional layers is N and each of the N convolutional layers has L sub-convolutional layers, each of the N convolutional layers includes M sub-residual networks having each different bypassing route for bypassing at least one of the L sub-convolutional layers, and wherein, at the process of (I), at least one specific sub-residual network to be dropped out is randomly selected among the N×M sub-residual networks.

15. The learning device of claim 14, wherein the processes of (I) to (III) are repeated for the same input image.

16. A learning device in which (i) one or more convolutional layers capable of applying one or more convolution operations to an input image or its corresponding one or more encoded input feature maps to thereby sequentially generate one or more encoded output feature maps and (ii) one or more residual networks capable of feed-forwarding the input image or its corresponding encoded input feature maps to its corresponding next convolutional layer through bypassing at least one of the convolutional layers or at least one of sub-convolutional layers included in at least one of the convolutional layers are included, comprising:

at least one memory that stores instructions; and at least one processor configured to execute the instructions to: perform processes of (I) randomly selecting a specific residual network to be dropped out among the residual networks, (II) (i) feeding the input image into at least one transformed CNN in which the specific residual network is dropped out, to thereby generate adjusted encoded output feature maps and (ii) generating a CNN output by using the adjusted encoded output feature maps, and (III) calculating one or more losses by using the CNN output and its corresponding GT and adjusting at least one parameter of the transformed CNN by backpropagating the losses;

wherein the learning device further includes: (i) one or more deconvolutional layers capable of applying one or more deconvolutional operations to at least part of the adjusted encoded output feature maps or its corresponding adjusted decoded input feature maps to thereby sequentially generate one or more adjusted decoded output feature maps and (ii) one or more intermediate layers, which are located between at least one of the convolutional layers and at least one of the deconvolutional layers, capable of applying one or more convolution operations to one or more inputs fed thereto and then feeding one or more outputs therefrom into at least one of the deconvolutional layers, wherein, at the process of (I), the processor performs a process of randomly selecting the specific residual network and at least one specific intermediate layer to be dropped out among the residual networks and the intermediate layers, and wherein, at the process of (II), the processor controls the transformed CNN such that the specific residual network and the specific intermediate layer are dropped out.

17. The learning device of claim 16, wherein the learning device further includes additional residual networks capable of feed-forwarding the adjusted decoded input feature maps to its corresponding next deconvolutional layer through bypassing at least one of the plurality of deconvolutional layers, wherein, assuming that (i) each of the N convolutional layers includes L sub-convolutional layers and (ii) each of the N deconvolutional layers includes L sub-deconvolutional layers, and the number of the intermediate layers is K, (1) each of the N convolutional layers includes M sub-residual networks having each different bypassing route through which at least one of the L sub-convolutional layers is bypassed and (2) each of the N deconvolutional layers includes M sub-residual networks having each different bypassing route through which at least one of the L sub-deconvolutional layers is bypassed, and wherein, at the process of (I), at least one specific intermediate layer and at least one specific sub-residual network to be dropped out are randomly selected among the K intermediate layers and the 2×N×M sub-residual networks, respectively.

18. The learning device of claim 16, wherein at least one of the intermediate layers is a dilated convolutional layer.

19. The learning device of claim 18, wherein, at the process of (III), the processor backpropagates the losses to thereby adjust at least one parameter of the deconvolutional layers, the intermediate layers, and the convolutional layers.

20. A testing device for testing a test image based on a convolutional neural network (CNN), comprising:

at least one memory that stores instructions; and at least one processor, on condition that, assuming that a learning device includes (i) one or more convolutional layers capable of applying one or more convolution operations to a training image or its corresponding one or more encoded input feature maps for training to thereby sequentially generate one or more encoded output feature maps for training and (ii) one or more residual networks capable of feed-forwarding the training image or its corresponding encoded input feature maps for training to its corresponding next convolutional layer through bypassing at least one of the convolutional layers or at least one of sub-convolutional layers included in at least one of the convolutional layers, (1) the learning device has performed a process of randomly selecting a specific residual network to be dropped out among the residual networks, (2) the learning device (i) has fed the training image into at least one transformed CNN in which the specific residual network is dropped out, to thereby generate adjusted encoded output feature maps for training and (ii) has generated a CNN output for training by using the adjusted encoded output feature maps for training, and (3) the learning device has calculated one or more losses by using the CNN output for training and its corresponding GT and has adjusted at least one parameter of the transformed CNN by backpropagating the losses; configured to execute the instructions to: perform processes of generating one or more encoded output feature maps for testing based on the test image and generating a CNN output for testing by using the encoded output feature maps for testing;

wherein, assuming that the number of the convolutional layers is N and each of the N convolutional layers has L sub-convolutional layers, each of the N convolutional layers includes M sub-residual networks having each different bypassing route for bypassing at least one of the L sub-convolutional layers, and wherein, at the process of (1), at least one specific sub-residual network to be dropped out is randomly selected among the N×M sub-residual networks.

21. The testing device of claim 20, wherein the processes of (1) to (3) are repeated for the same training image.

22. A testing device for testing a test image based on a convolutional neural network (CNN), comprising:

at least one memory that stores instructions; and at least one processor, on condition that, assuming that a learning device includes (i) one or more convolutional layers capable of applying one or more convolution operations to a training image or its corresponding one or more encoded input feature maps for training to thereby sequentially generate one or more encoded output feature maps for training and (ii) one or more residual networks capable of feed-forwarding the training image or its corresponding encoded input feature maps for training to its corresponding next convolutional layer through bypassing at least one of the convolutional layers or at least one of sub-convolutional layers included in at least one of the convolutional layers, (1) the learning device has performed a process of randomly selecting a specific residual network to be dropped out among the residual networks, (2) the learning device (i) has fed the training image into at least one transformed CNN in which the specific residual network is dropped out, to thereby generate adjusted encoded output feature maps for training and (ii) has generated a CNN output for training by using the adjusted encoded output feature maps for training, and (3) the learning device has calculated one or more losses by using the CNN output for training and its corresponding GT and has adjusted at least one parameter of the transformed CNN by backpropagating the losses;

configured to execute the instructions to: perform processes of generating one or more encoded output feature maps for testing based on the test image and generating a CNN output for testing by using the encoded output feature maps for testing;

wherein, on condition that the test device includes (i) the convolutional layers capable of applying the convolution operations to the test image or its corresponding one or more encoded input feature maps for testing to thereby sequentially generate the encoded output feature maps for testing and (ii) the residual networks capable of feed-forwarding the test image or its corresponding encoded input feature maps for testing to its corresponding next convolutional layer through bypassing at least one of the convolutional layers or at least one of the sub-convolutional layers included in at least one of the convolutional layers, the processor performs processes of (I) randomly selecting a certain residual network to be dropped out among the residual networks, and (II) feeding the test image into the transformed CNN in which the certain residual network is dropped out, to thereby generate adjusted encoded output feature maps for testing, and then generating the CNN output for testing by using the adjusted encoded output feature maps for testing.

23. The testing device of claim 22, wherein the testing device further includes: (i) one or more deconvolutional layers capable of applying one or more deconvolutional operations to at least part of the adjusted encoded output feature maps for testing or its corresponding adjusted decoded input feature maps for testing to thereby sequentially generate one or more adjusted decoded output feature maps for testing and (ii) one or more intermediate layers, which are located between at least one of the convolutional layers and at least one of the deconvolutional layers, capable of applying one or more convolution operations to one or more inputs fed thereto and then feeding one or more outputs therefrom into at least one of the deconvolutional layers, wherein, at the process of (I), the processor randomly selects the certain residual network and at least one certain intermediate layer to be dropped out among the residual networks and the intermediate layers, and wherein, at the process of (II), the processor controls the transformed CNN such that the certain residual network and the certain intermediate layer are dropped out.

24. The testing device of claim 23, wherein the testing device further includes additional residual networks capable of feed-forwarding the adjusted decoded input feature maps for testing to its corresponding next deconvolutional layer through bypassing at least one of the plurality of deconvolutional layers, wherein, assuming that (i) each of the N convolutional layers includes L sub-convolutional layers and (ii) each of the N deconvolutional layers includes L sub-deconvolutional layers, and the number of the intermediate layers is K, (1) each of the N convolutional layers includes M sub-residual networks having each different bypassing route through which at least one of the L sub-convolutional layers is bypassed and (2) each of the N deconvolutional layers includes M sub-residual networks having each different bypassing route through which at least one of the L sub-deconvolutional layers is bypassed, and wherein, at the process of (I), at least one certain intermediate layer and at least one certain sub-residual network to be dropped out are randomly selected among the K intermediate layers and the 2×N×M sub-residual networks, respectively.

25. The testing device of claim 23, wherein at least one of the intermediate layers is a dilated convolutional layer.

26. The testing device of claim 24, wherein, at the process of (3), the learning device has backpropagated the losses to thereby adjust at least one parameter of the deconvolutional layers, the intermediate layers, and the convolutional layers.

* * * * *